(12) United States Patent
Warren

(10) Patent No.: US 11,261,289 B2
(45) Date of Patent: *Mar. 1, 2022

(54) METHOD OF LINING A PIPELINE WITH A DELAYED CURING RESIN COMPOSITION

(71) Applicant: Warren Environmental & Coating, LLC, Middleborough, MA (US)

(72) Inventor: Danny Warren, Carver, MA (US)

(73) Assignee: Warren Environmental & Coating, LLC, Middleborough, MA (US)

( * ) Notice: Subject to any disclaimer, the term of this patent is extended or adjusted under 35 U.S.C. 154(b) by 332 days.

This patent is subject to a terminal disclaimer.

(21) Appl. No.: 15/295,486

(22) Filed: Oct. 17, 2016

(65) Prior Publication Data

US 2018/0105635 A1 Apr. 19, 2018

(51) Int. Cl.

| | | |
|---|---|---|
| *C08G 59/58* | (2006.01) | |
| *C08G 59/24* | (2006.01) | |
| *C08G 59/22* | (2006.01) | |
| *C09D 163/00* | (2006.01) | |
| *B32B 1/08* | (2006.01) | |
| *B32B 5/02* | (2006.01) | |
| *B32B 27/08* | (2006.01) | |

(Continued)

(52) U.S. Cl.
CPC .......... *C08G 59/58* (2013.01); *B29C 63/0021* (2013.01); *B29C 63/0069* (2013.01); *B29C 63/28* (2013.01); *B29C 63/34* (2013.01); *B29C 63/48* (2013.01); *B32B 1/08* (2013.01); *B32B 5/022* (2013.01); *B32B 27/08* (2013.01); *B32B 27/12* (2013.01); *B32B 27/304* (2013.01); *B32B 27/32* (2013.01); *B32B 27/34* (2013.01); *B32B 27/36* (2013.01); *B32B 37/06* (2013.01); *B32B 37/10* (2013.01); *C08G 59/226* (2013.01); *C08G 59/245* (2013.01); *C09D 163/00* (2013.01); *B29C 2063/485* (2013.01); *B29K 2063/00* (2013.01); *B29K 2067/00* (2013.01); *B29K 2105/0854* (2013.01); *B29K 2995/0037* (2013.01); *B29L 2009/00* (2013.01); *B29L 2023/22* (2013.01); *B32B 2262/0276* (2013.01); *B32B 2307/70* (2013.01); *B32B 2363/00* (2013.01); *B32B 2597/00* (2013.01); *F16L 55/1656* (2013.01)

(58) Field of Classification Search
CPC ...................................... C08G 59/58
See application file for complete search history.

(56) References Cited

U.S. PATENT DOCUMENTS

| | | | | |
|---|---|---|---|---|
| 2008/0017263 | A1* | 1/2008 | Robinson ............... | B29C 70/36 138/99 |
| 2008/0071035 | A1* | 3/2008 | Delsman ............... | C08L 71/126 525/396 |

(Continued)

*Primary Examiner* — Megan McCulley
(74) *Attorney, Agent, or Firm* — Barlow, Josephs & Holmes, Ltd.

(57) ABSTRACT

A resin composition and method for installing a pipe liner that allows the liner to be fully wet out with a resin and activator and stored for a period of up to six months prior to installation and curing. A method of lining a pipe with a delayed curing resin composition is also provided that includes fully wetting out a liner with a blended two part epoxy composition such that the liner can be transported in a wet out fashion, placed in a pipe to be lined and repositioned as needed without concern for the resin composition to begin curing.

9 Claims, 4 Drawing Sheets

(51) Int. Cl.
*B32B 27/12* (2006.01)
*B32B 27/36* (2006.01)
*B32B 27/30* (2006.01)
*B32B 27/34* (2006.01)
*B32B 27/32* (2006.01)
*B32B 37/10* (2006.01)
*B32B 37/06* (2006.01)
*B29C 63/34* (2006.01)
*B29C 63/48* (2006.01)
*B29C 63/00* (2006.01)
*B29C 63/28* (2006.01)
*B29K 67/00* (2006.01)
*B29K 63/00* (2006.01)
*B29K 105/08* (2006.01)
*B29L 23/00* (2006.01)
*B29L 9/00* (2006.01)
*F16L 55/165* (2006.01)

(56) References Cited

U.S. PATENT DOCUMENTS

| | | | |
|---|---|---|---|
| 2009/0229696 A1* | 9/2009 | Warren | F16L 55/1651 138/98 |
| 2010/0009086 A1* | 1/2010 | Tran | C09D 163/00 427/386 |
| 2010/0144965 A1* | 6/2010 | Marks | C08G 59/066 524/612 |
| 2012/0061820 A1* | 3/2012 | Maejima | H01L 21/563 257/734 |
| 2014/0234600 A1* | 8/2014 | Wang | B32B 5/022 428/212 |
| 2018/0346638 A1* | 12/2018 | Warren | C08G 59/02 |

* cited by examiner

METHOD OF LINING A PIPELINE WITH A DELAYED CURING RESIN COMPOSITION

BACKGROUND OF THE INVENTION

The present invention generally relates to a delayed curing resin composition. More specifically, the present invention relates to a resin composition that allows the resin and catalyst to be mixed for an extended period creating a long pot life composition which cures only when subjected to elevated temperature.

Generally, epoxy coatings are well known in the art and due to their exceptional durability and structural properties epoxy based protective coatings have gained commercial acceptance as protective and decorative coatings for use on a wide variety of materials. For example, epoxy based protective coatings represent one of the most widely used methods of corrosion control. They are used to provide long term protection of steel, concrete, aluminum and other structures under a broad range of corrosive conditions, extending from atmospheric exposure to full immersion in highly corrosive environments. Further, epoxy coatings are readily available and are easily applied by a variety of methods including spraying, rolling and brushing. They adhere well to steel, concrete and other substrates, have low moisture vapor transmission rates and act as barriers to water, chloride and sulfate ion ingress, provide excellent corrosion protection under a variety of atmospheric exposure conditions and have good resistance to many chemicals and solvents. As a result, numerous industries including maintenance, marine, construction, architectural, aircraft and product finishing have adopted broad usage of epoxy coating materials.

The most common material utilized in the epoxy coating industry today is a multi-part epoxy material. In general the epoxy includes a first base resin matrix formed from a bisphenol material such as bisphenol A (BPA) and at least a second catalyst or hardener, although other components such as a pigment agent or an aggregate component may also be added. While the two parts remain separate, they remain in liquid form. After the two parts are mixed together, they begin a curing process that is typically triggered by exposure to heat, humidity or a ultra-violet light source, whereby the mixed material quickly begins to solidify. As a result, it is necessary to mix only a sufficient amount of compound such that it can be worked effectively before set up occurs. Accordingly, the use and application of these compounds is a tedious, slow and expensive proposition.

The hardeners are typically nitrogen-containing bases that are well known to the person skilled in the art as curing agents or curing accelerators for epoxy resins. Such systems have, however, only limited storage stability because those bases react with epoxides even at relatively low temperature, in some cases even at room temperature, which is manifested in an increase in the viscosity of the epoxy resin formulation and, on prolonged storage, results in hardening of the mixture. The greater the reactivity of the nitrogen-containing base, the lower the storage stability of the epoxy resin mixture and the shorter the pot life. For that reason, such systems are formulated as two-component systems, that is to say the epoxy resin and the nitrogen-containing base are stored separately and mixed only shortly before processing.

There has been no shortage of attempts at improving the storage stability of such systems by developing appropriate curing systems. The problem posed is particularly complex because, at the same time as the requirement for a high storage stability and a long pot life, there should not be any deterioration either in the reactivity at the desired curing temperature or in the properties of the fully cured materials. For example, adsorption techniques have been used to control and modify various types of chemical reactions. These techniques usually involve adsorbing a chemical reagent in an adsorbent material. Commonly used adsorbent materials for this purpose are materials having internal pore structure and active pore sites, and can consist of silica gel, certain types of carbon black, activated charcoal, and the like. In practice, when using an adsorbed chemical reagent in a process involving a controlled chemical reaction, the adsorbed chemical reagent and adsorbent is admixed with the reacting component at relatively low temperatures and subsequently heated to desorb the adsorbed component. Heating the adsorbent and adsorbate product desorbs the adsorbate reagent reactant making it available for a reaction with a reacting component. The mixture prior to being activated is relatively inert and fairly safe to handle.

While the aforementioned reagent adsorption solves many of the problems in regard to process control, handling etc., there is in most instances a slow escape of the chemical reagent from the adsorbent. In many instances, this slow escape of chemical reagent from the adsorbent creates problems. The desorbed chemical reagent if in a reactive environment or reactive medium will allow a slow reaction between reagents to proceed. If the rate of escape of reactant is large and the resulting reaction is exothermic there is a possibility that the exothermic heat effect will generate sufficient heat in the mixture to desorb and activate the entire mixture, or at least accelerate desorption. Further, the slow escape of chemical reagent will cause product deterioration, and shortened shelf life of an adsorbed component mixture. In general, depending on the type of adsorbent and adsorbate chemical reagent, the rate of escape of adsorbate from adsorbent will vary. Even a small escape of adsorbate is objectionable and in certain instances can cause very serious effects.

In the reagent adsorption techniques known to the prior art, adsorbed chemical reagent when present in a surrounding medium containing a reactive medium, is not rendered completely inert. In general, an adsorbent has an open pore structure. A portion of the adsorbed chemical reagent is in immediate contact with the reactive medium and is therefore in a potentially reactive position. The adsorbed chemical reagent molecules, even though attracted and held in the active pore sites by Van der Waals forces will often be dislodged from the adsorbent by the normal molecular vibration of the chemical components, and will be free to react with the reactive medium. The tendency to dislodge the adsorbed adsorbate and the seriousness of this effect will vary with the type of adsorbate, the adsorbent and the reactive medium and the other possible components having a tendency to displace the adsorbate. Normally, the function of the adsorbent is to prevent or delay a reaction between the adsorbed chemical reagent and a reactive surrounding medium.

The more efficiently this function is performed, in general, the more desirable is the adsorption system. Therefore, adsorption of chemical reagents known to the prior art will not produce complete inertness, of a chemical reagent. Further, if the adsorbent in the chemical reagent combination is selected so that the adsorbate is very securely attached to the adsorbent, thus producing a very inert adsorbent adsorbate combination, it may require an extremely powerful displacing agent or heat effect to activate the material. For example, when the adsorbent adsorbate must be heated to extremely high temperatures in order to desorb the adsorbed reagent, other reagents in the mixture may be decomposed. This effect may completely prohibit the use of an adsorbed chemical reagent. An example is a decomposable blowing agent in a foamable mixture that will cure at a relatively low temperature. If the mixture is heated high enough to desorb the blowing agent, the reaction may proceed too rapidly and scorch, burn or cure the resin poorly.

In view of the foregoing, there is a need for a delayed curing epoxy resin composition. Further, there is a need for a delayed curing epoxy resin wherein the hardener and resin components can be fully blended yet the curing reaction still be delayed to provide the composition with a long pot life. There is still a further need for method of lining a pipe system whereby a liner is fully wet out with a blended two part epoxy composition yet the curing reaction is delayed for an extended period allowing the wet out liner to be stored and installed before the reaction is activated.

BRIEF SUMMARY OF THE INVENTION

In this regard, the present invention relates to a new resin composition and method for installing a pipe liner that allows the liner to be fully wet out with a resin and activator and stored for a period of up to six months prior to installation and curing. Further the present invention provides a method of lining a pipe with a delayed curing resin composition that includes fully wetting out a liner with a blended two part epoxy composition such that the liner can be transported in a wet out fashion, placed in a pipe to be lined and repositioned as needed without concern for the resin composition to begin curing.

The new resin is a base resin composition consisting of a blend of anhydrides, bisphenol A, and bisphenol F resins. The resin blend is combined with proprietary activator component to create a new epoxy composition that has an extended shelf life of up to six months after the base resin is mixed with the activator component. This composition provides for a resin wherein the curing process can be delayed indefinitely prior to the application of a specific threshold of heat.

Another unique feature is that in the prior art the resins of the present invention would fail when applied in a wet condition. In the known industry, anhydrides based epoxies will not stick or have any adhesion at all to a wet surface. Further, other epoxy resins and the amino amine activators will not have strong adhesion to wet substrates. In contrast, the resin composition, as a result of the activator component disclosed herein, allows the composition to adhere to and cure on saturated wet surfaces.

In accordance with the method of the present invention, the method targets the cured in place liner industry for potable water lines, especially asbestos and lead lined pipe. The benefit to the industry is that the pipe lining bags can be wetted out in factory conditions and shipped across the country without the need of refrigerated transport trailers. The other major benefit is, once the bag reaches the job site, there is no reason to rush or hurry the installation process. The mixed resin installed in the liner at the factory will have a shelf life of up to 90 days without any chance of an exothermic reaction causing cure resulting in losing the bag, or the threat of spontaneous combustion which can happen with other wetted out liners.

Therefore, it is an object of the present invention to provide a delayed curing epoxy resin composition. Further, it is an object of the present invention to provide a delayed curing epoxy resin wherein the hardener and resin components can be fully blended yet the curing reaction still be delayed to provide the composition with a long pot life. It is still a further object of the present invention to provide a method of lining a pipe system whereby a liner is fully wet out with a blended two part epoxy composition yet the curing reaction is delayed for an extended period allowing the wet out liner to be stored and installed before the reaction is activated.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
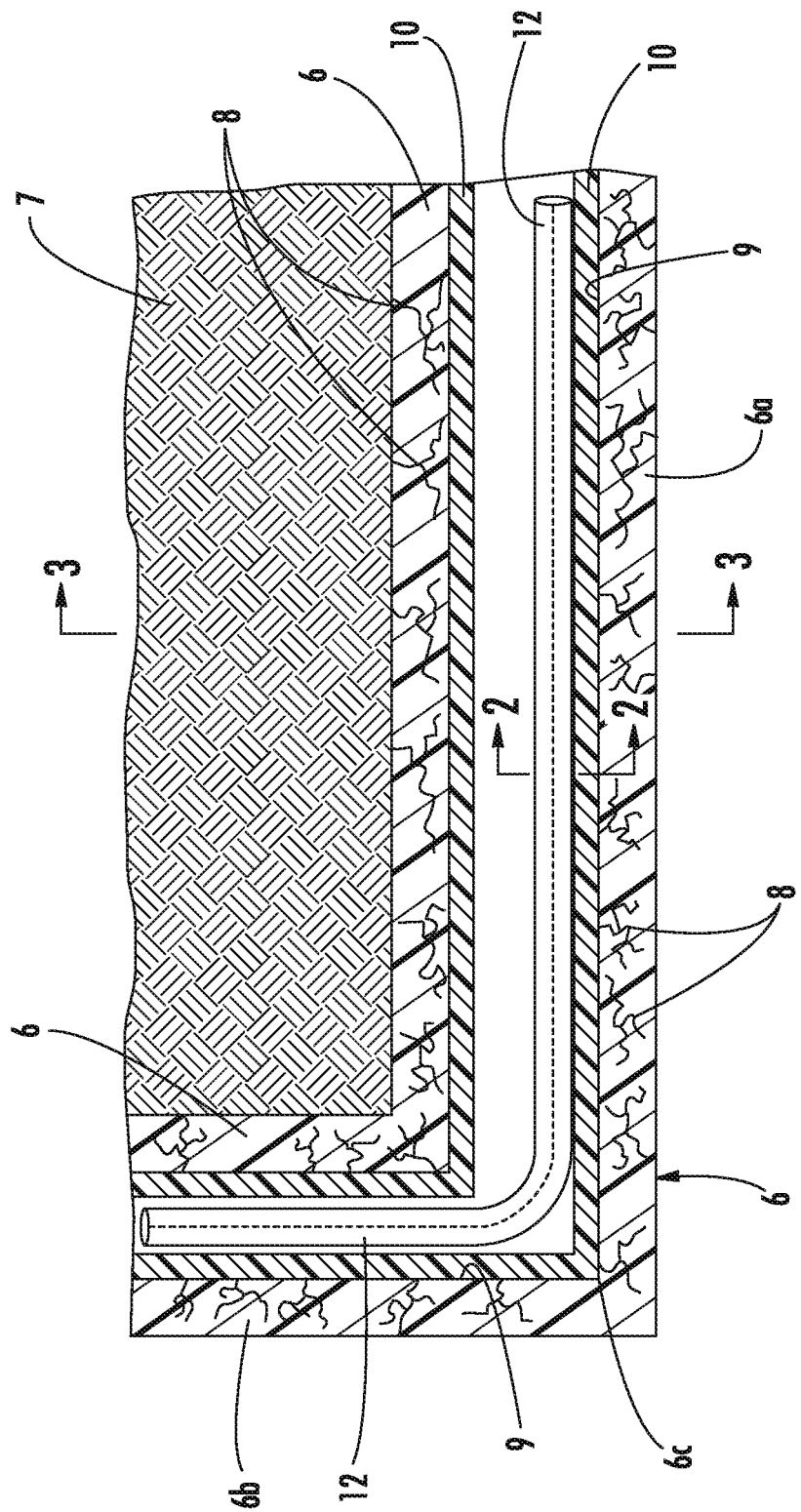
FIG. 1 is a side cross-sectional view of a pipeline within the ground showing a collapsed lining hose placed in position in the pipeline in accordance with the method of the present invention.

Disclosed herein is a resin composition and method for installing a pipe liner that allows the liner to be fully wet out with a resin and activator and stored for a period of up to six months prior to installation and curing. Further, the present invention discloses a method of lining a pipe with a delayed curing resin composition that includes fully wetting out a liner with a blended two part epoxy composition such that the liner can be transported in a wet out fashion, placed in a pipe to be lined and repositioned as needed without concern for the resin composition to begin curing.

The composition of the present invention is a new blended resin composition consisting of a blend of cyclic anhydrides, bisphenol A, and bisphenol F resins. While single component, heat cured epoxy compositions have been disclosed in the past, the blended components have a relatively short shelf life and require that, once blended, the one component epoxy be stored and transported in refrigeration. The resin blend of the present invention is combined with proprietary activator component to create a new epoxy composition that has an extended shelf life of up to six months after the base resin is mixed with the activator component. This composition provides for a resin wherein the curing process can be delayed indefinitely prior to the application of a specific threshold of heat.

It is known that primary and secondary amines and their epoxy-adducts are the most widely used activators for epoxy resins. The selection of an activator plays an important role in determining the final performance of the epoxy-amine thermoset. The ethyleneamine hardeners such as tetraethylenepentamine (TEPA), when cured with epoxy resins, provide excellent reactivity and physical properties including excellent chemical and solvent resistance but are brittle and have limited flexibility and toughness. However, it is also well known that these ethyleneamines have poor compatibility with epoxy resins and will blush under humid conditions. In wet conditions the activators can exude to the surface during cure and react with atmospheric carbon dioxide and moisture to form undesirable carbamates also known as 'blush'.

The activator of the present composition is a composition that preblends the TEPA activator in an activator preblend composition composed of a small percentage of liquid bisphenol, granular bisphenol and the tetraethylenepentamine (TEPA) activator. The activator is fully blended in a manner that overcomes the issues previously known when utilizing TEPA activators. This preblend activator is then combined with the base resin material. In the prior art, if the base resin were to be mixed without the activator of the present invention the resin composition begins to cure in 48 hours into an unworkable gel. However, with the activator preblend composition disclosed herein, the blended, one component composition remains fully liquid and workable having a pot life of up to six months.

Another unique feature is that in the prior art the resins of the present invention would fail when applied in a wet condition. In the known industry, anhydrides based epoxies will not stick or have any adhesion at all to a wet surface. Further, other epoxy resins and the amino amine activators will not have strong adhesion to wet substrates. In contrast, the resin composition, as a result of the activator component disclosed herein, allows the composition to adhere to and cure on saturated wet surfaces.

Once the line is installed and inspected and everything is satisfactory. Steam is then applied to inflate the liner and raise the temperature to 170° and hold it at 170° for one hour. The material will spike out in between 380 and 400° on the exotherm, and this will give a much higher operating temperature for the finished lined pipe. It should be appreciated that the liner of the present invention may be inflated using a calibration hose, however, many liners currently in use have an airtight layer formed therein that allows inflation of the liner without the need for a calibration hose.

Not only can the new resin be used for drinking water, wastewater and fuel lines, it can also be used for steam and steam return lines We believe this new resin will revolutionize this industry worldwide and lead the way into the future for non-toxic, totally reliable, very strong products with superior heat and chemical resistance capabilities for future generations. We believe this material will have an expected life of 100 to 150 years in the ground based on private testing at the University of Pittsburgh and the University of South Carolina. Test liners have been installed with and without the preblend activator composition. Without the preblend activator, the adhesion results are not favorable. With the preblend activator, there is strong adhesion of the liner to the host pipe.

In accordance with the process of the present invention, the inside surface 9 of the pipeline 6, to be repaired, is preferably first prepared to remove debris and dirt to ensure a good bond, as will be described in detail below. Preferably, the inner wall surfaces 9 of pipeline 6 are cleaned by injecting highly pressurized water into the pipeline. The pressurized water stream strikes the inside walls forcefully and scrubs the walls. For example, the water is provided at up 30,000 psi to ensure a clean surface. Even higher pressure can be used, if necessary. Known water spraying devices are used for this step of the process. The injected water substantially removes the foreign debris to leave a clean inner wall surface 9 remaining. While high-pressure water is preferably used, air or steam may be used instead. Also, additional cleaning agents are not preferably used but such cleaning agents could be added to the water, air or steam to assist in cleaning depending the application and environment.

After surface cleaning is complete, any standing water left remaining, such as that on the bottom of the pipeline 6, must be removed. High-pressure air, using known air blowing equipment, is injected into the pipeline to clear it of any remaining water and cleaning media. Referring to FIG. 1, the host pipeline 6 having inside walls 9 with cracks 8 in their infrastructure is shown. A flexible lining hose 12, which has been fully wet out with the preblend resin composition of the present disclosure is prepared and positioned in the pipeline 6. The lining hose 12 is inserted into the pipeline 6 by techniques known in the industry. Preferably, the lining hose 12 is pulled or dragged into the pipeline 6 in a collapsed state using a cable and winch-operating system (not shown) that, for example, can use ¼ inch aircraft cable. The lining hose 12 is introduced directly into the pipeline 6 so that it rests on the bottom surface of the pipeline 6. While it is preferred that the lining hose 12 is dragged into the pipeline 6 to be repaired, it is also possible to invert the lining hose 12 into the pipeline 6 through the use of compressed air or other fluids such as water.

Figure 2:
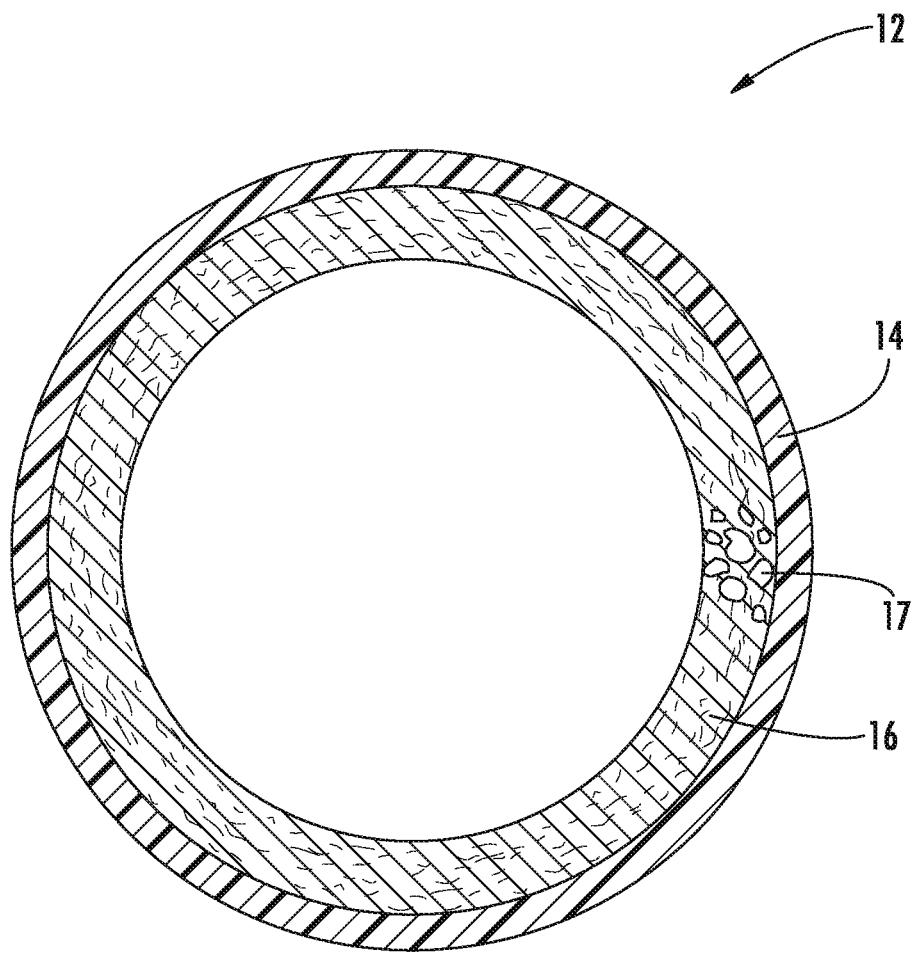
FIG. 2 is a cross-sectional view through the line 2-2 of FIG. 1 showing the layers of the lining hose.

Turning now to FIG. 2, details of the construction of the lining hose 12 of the present invention is shown. The flexible lining hose 12 includes an outer layer 14 that surrounds an inner layer 16. The outer layer 14 can be made from any suitable material that is rugged and which will adhere to thermosetting resin 10. Typically, the outer layer 14 is made from a plastic material such as polyvinyl chloride, polyurethane, polyethylene, polypropylene, polyester, polyamide, or the like.

The inner layer 16 is a layer of non-woven fibrous material, preferably felt, is permanently adhered to the outer layer of the lining hose 12. The felt inner layer 16 is provided as a suitable resin-absorbing material. More particularly, polyester-needled felt materials can be used to form the inner layer 16. These felt materials have good resin-absorbency properties. The felt material soaks up the resin so that the inner layer 16 becomes impregnated with the resin 17. The resin 17 may be applied to the inner layer 16 using vacuum or injection. Alternately, the lining hose 12 may be filled with an amount of resin 17 calculated to fully wet out the inner layer and the lining hose 12 can be then drawn through rollers to squeeze the resin 17 into the inner layer material 16. It is understood that the resin 17 can be applied to the felt inner layer 16 directly at the pipeline site where the lining hose 12 will be installed or at an off-site coating facility and then transported to the pipeline site.

Thus, the inner layer 16 is wetted out with the thermosetting resin 17 in liquid form ("wet out") prior to placing the lining hose 12 in the pipeline 6. As can be seen in FIG. 2, the resin 17 is absorbed by and resides within the felt inner layer 16. Thus, the felt inner layer 16 serves as a carrier for the resin 17.

In accordance with the method of the present invention, the method targets the cured in place liner industry for potable water lines, especially asbestos and lead lined pipe. The benefit to the industry is that the pipe lining bags can be wetted out in factory conditions and shipped across the country without the need of refrigerated transport trailers. The other major benefit is, once the bag reaches the job site, there is no reason to rush or hurry the installation process. The mixed resin installed in the liner at the factory will have a shelf life of up to 90 days without any chance of an exothermic reaction causing cure resulting in losing the bag, or the threat of spontaneous combustion which can happen with other wetted out liners.

This method further allows inspecting the bag positioning and installation prior to the final cure. This consists of a set of cans seals that will go on to each end of the pipe to be lined. Once the cans are in place, the line can be pressurized with the use of a small air compressor. A camera can run up and down the line by inserting it through a small flapped door in the can at one end, and inspect everything with pan and tilt capability to inspect bends, turns, 90s, 45s, and any possible intruding pipes or anything in the line that could be detrimental to the final product. At temperatures below about 160 degrees Fahrenheit the liner bag can still be deflated, reworked and repositioned.

Figure 3:
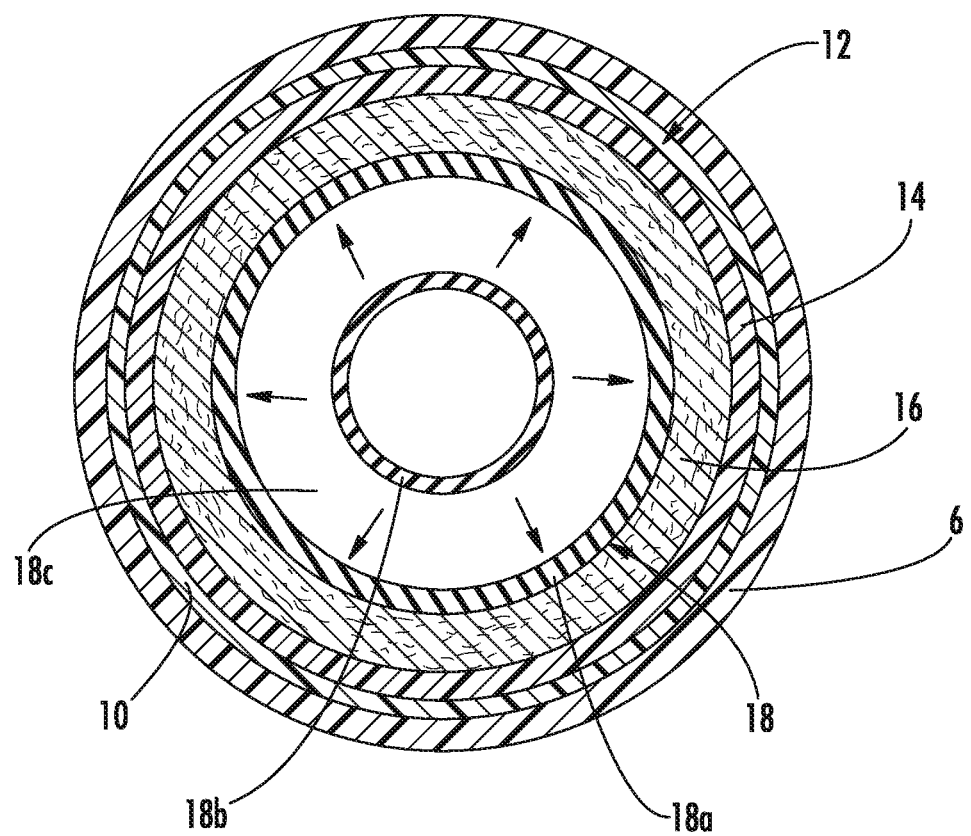
FIG. 3 is a cross-sectional view through the line 3-3 of FIG. 1 showing the step of the calibration hose pressing the lining hose into communication with the inner wall of the pipeline.

Referring to FIG. 3, in one embodiment, a calibration hose, generally referred to as 18, is introduced into the resin-saturated lining hose 12 using techniques known in the industry. The calibration hose 18 can be made from materials such as polyvinyl chloride, polyurethane, polyethylene, polypropylene, polyesters, polyamides, or the like. The calibration hose 18 is not treated with a curing resin in the method of this invention. Most importantly, the calibration hose does not adhere to resin 17 residing in the felt inner layer 16. The calibration hose 18 is inserted so that an outer peripheral region 18a is in communication with inner layer 16. The outer peripheral region is held in place by clamps (not shown) or the like so that an inner region 18b may be inverted therethrough. The calibration hose 18 is filled with a pressurized fluid, namely, at middle region 18c. Typically, water is used as the pressurized fluid by air or steam may be used. In one embodiment for introducing the calibration hose 18 into the lining hose 12, a known inversion technique is used. As the pressurized fluid is directed into the middle region, the calibration hose 18 is pulled via the inner region 18b. The inverted calibration hose 18 walks along the inside of the lining hose 12 and expands and presses it against the inner wall 9 of the pipeline 6.

The use of pressurized water (not shown) to invert the calibration hose 18 has several benefits. Particularly, the calibration hose 18 is filled with water gradually so that the calibration hose 18 walks-through the pipeline 6. As the calibration hose 18 is fed into the lining hose 12, it can easily travel, as shown in FIG. 1, from a vertical pipeline section 6b to a horizontal pipeline section 6a and vice versa. For example, vertical pipelines 6b generally refer to auxiliary pipelines that communicate with a horizontal (main) pipeline 6a. Joint connectors 6c are provided to transition from a horizontal section 6a to a vertical section 6b. It is these joint sections that pose particular problems with prior art processes for repairing pipelines because air pockets are frequently introduced and lining hoses break or rip at these joints. However, with the present invention, air pockets in the calibration hose 18 are eliminated by slowly filling the calibration hose 18 with water and so that the joint sections 18c are completely sealed to completely fill cracks, stop leaks to provide a monolithic epoxy inner layer, even at joint sections 18c.

The pressurized water makes the inverted calibration hose 18 push against the flexible lining hose 12 and forces the lining hose 12 outwardly so that it presses against and engages the interior walls 9 of the pipeline 6. As a result, the lining hose 12 contacts and conforms to the shape of the internal pipeline walls 9. Due to the durability of the lining hose 12, joint sections 18c are adequately accommodated as the lining hose 12 is expanded and stretched to the contours of the inner wall surfaces 9 of the pipeline 6.

The water or steam injected into the calibration hose 18 is heated to substantially cure and harden the resin 17. Preferably, the water is heated to a temperature of at least 175° F. and more preferably to a temperature of about 180° F. The temperatures can vary depending on the resin selected for use. The curing reaction is exothermic so the curing of the resin, itself, generates heat that further improves the curing rate. Also, the resin 17 may contain additional heat-initiated curing agents that accelerate the curing process. Upon the curing and hardening of the resin 17, the lining hose 12 becomes attached to the wall surfaces 9.

Figure 4:
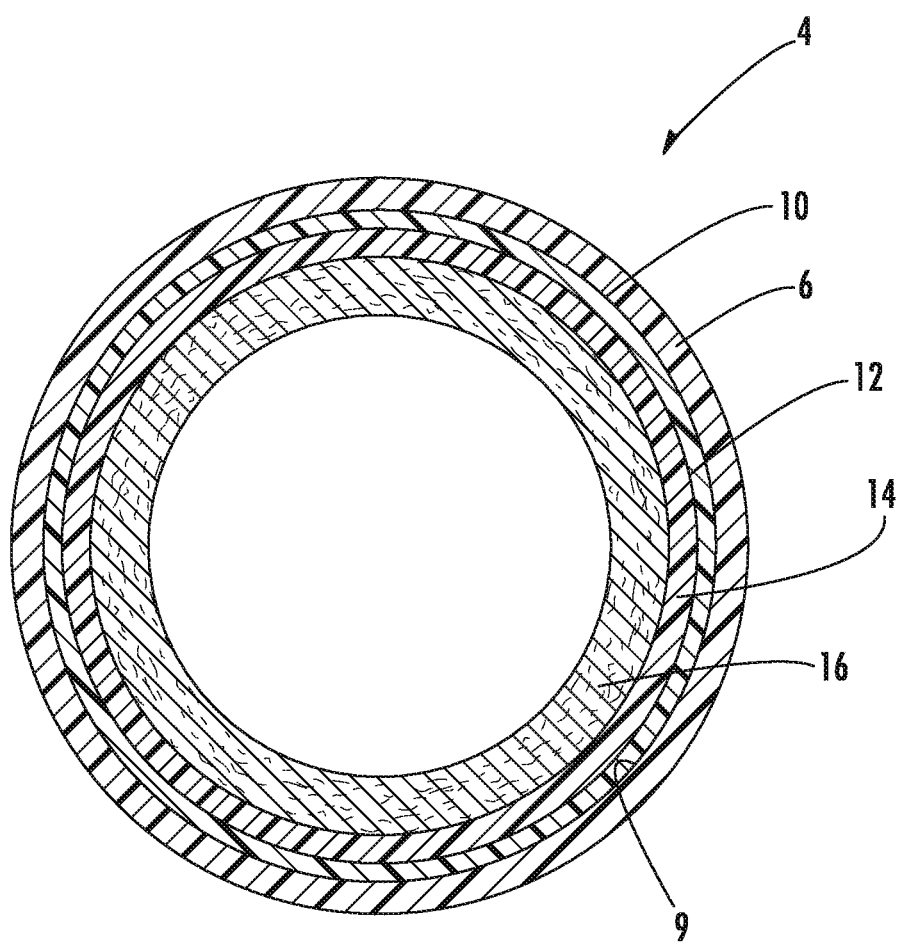
FIG. 4 is a cross-sectional view through the line 3-3 of FIG. 1 showing the lining hose fully installed after the calibration hose has been removed in accordance with the method of the present invention.

The calibration hose 18 can then be removed from the lining hose 12 using techniques known in the art. Typically, a rope or cable is attached to the trailing end of the calibration hose 18. An operator pulls on the rope or cable to remove the calibration hose 18 from the lining hose 12. FIG. 4 shows the pipeline 4 with inside walls 6 after the calibration hose 18 has been removed. The lining hose 12 is firmly fixed to the interior walls 6 of the pipeline.

The resulting pipeline is a repaired composite structure shown generally as 4 in FIG. 4, including the lining hose 12 adhered to the inner surface 9 of the pipeline 6. The resulting composite pipeline structure 4 is rigid and has good mechanical integrity thus providing a leak-free and completely sealed monolithic structure. The lined pipeline 4 has high mechanical integrity and strength because the voids formed by the presence of periodic joints in the pipeline that are inherent in pipefitting. The method of the present invention enables the voids at the joints to be filled to, in turn, provide a smooth and continuous interior surface. Thus, the structural integrity is greatly improved when a lining is installed in accordance with the present invention.

Various other components may be included and called upon for providing for aspects of the teachings herein. For example, additional materials, combinations of materials and/or omission of materials may be used to provide for added embodiments that are within the scope of the teachings herein.

In the present application a variety of embodiments are described. It is to be understood that any combination of any of these variables can define an embodiment of the invention. For example, a combination of a particular dopant material, with a particular compound, applied in a certain manner might not be expressly stated, but is an embodiment of the invention. Other combinations of articles, components, conditions, and/or methods can also be specifically selected from among variables listed herein to define other embodiments, as would be apparent to those of ordinary skill in the art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

Therefore, it can be seen that the present invention provides s delayed curing epoxy resin composition, wherein the hardener and resin components can be fully blended yet the curing reaction still be delayed to provide the composition with a long pot life. It can also be seen that the present invention to provides a method of lining a pipe system whereby a liner is fully wet out with a blended epoxy composition yet the curing reaction is delayed for an extended period allowing the wet out liner to be stored and installed before the reaction is activated.

What is claimed:

1. A delayed cure, pipe lining composition consisting of:
a base containing cyclic anhydride, bisphenol A and bisphenol F resins; and
an activator preblend containing tetraethylenepentamine mixed into liquid bisphenol and granular bisphenol said tetraethylenepentamine having reduced reactivity as a result of being bound into said activator preblend,
wherein said activator preblend and base are fully blended providing a one component liquid resin composition having a workable pot life of up to six months.

2. The composition of claim 1, wherein said one component resin remains liquid at temperatures below 160 degrees Fahrenheit.

3. The composition of claim 1, wherein said one component resin fully cures in one hour at temperatures above 170 degrees Fahrenheit.

4. A delayed cure, pipe lining composition consisting of:
a base containing cyclic anhydride, bisphenol A and bisphenol F resins;
an activator preblend containing tetraethylenepentamine mixed into liquid bisphenol and granular bisphenol said tetraethylenepentamine having reduced reactivity as a result of being bound into said activator preblend,
wherein said activator preblend and base are fully blended providing a one component liquid resin composition; and
a multi-layer pipe lining composite fully wet out with said fully blended activator and base providing a pipe lining composition having a workable pot life up to least six months.

5. The composition of claim 4, wherein said activator preblend and base remains liquid at temperatures below 160 degrees Fahrenheit.

6. The composition of claim 4, wherein said activator preblend and base fully cures in one hour at temperatures above 170 degrees Fahrenheit.

7. The composition of claim 4, wherein an outer layer of the pipe lining composite is made of a material selected from the group consisting of polyvinyl chloride, polyurethane, polyethylene, polypropylene, polyesters, and polyamides.

8. The composition of claim 4, wherein an inner layer of the pipe lining composite further includes a non-woven fibrous material.

9. The composition of claim 8, wherein the non-woven fibrous material is a polyester-needled felt.

* * * * *